June 30, 1959 F. RENTZ ET AL 2,892,282
LINE COMPENSATOR HAVING INTERCHANGEABLE WEIGHTS
Filed Jan. 11, 1957

INVENTORS
FRANK RENTZ
ANNA RENTZ
BY
David K. Kilgore
ATTORNEY

United States Patent Office 2,892,282
Patented June 30, 1959

2,892,282

LINE COMPENSATOR HAVING INTERCHANGEABLE WEIGHTS

Frank Rentz and Anna Rentz, Wells, Minn.

Application January 11, 1957, Serial No. 633,792

4 Claims. (Cl. 43—42.72)

Our present invention relates, broadly, to the field of fishing tackle and, specifically, to a fishing line compensating device having interchangeable weights or sinkers.

The principal object of this invention is to provide a line compensating device that will function equally well in combination with conventional casting, trolling or light spinning tackle assemblies to either relieve stress in the event of a snagged line and/or to impart tensioned strain to a line and tackle assembly having a hooked fish.

Another object of this invention is to provide a fishing line strain-compensating device having means for interchangeably attaching weights or sinkers.

Another object of this invention is to provide a fishing line strain-compensating device having spring means capable of freeing a snagged line by force imparted thereto by line manipulation.

A still further object of this invention is to provide a fishing line strain-compensating device having means for interchangeably applying weights or sinkers thereto and wherein said weights or sinkers act as a keel or bottom locater.

A still further object of this invention is to provide a fishing line strain-compensating device that is capable of action in either direction of pull or strain singly or simultaneously in both directions of pull.

A still further object of this invention is to provide a fishing line strain-compensating device having interchangeable weights that is simple and highly efficient in operation, simple and inexpensive to manufacture and which in no way interferes with the accepted fishing techniques or requires the alteration of conventional tackle.

These and other objects of the invention will become apparent from the following specification and claims taken in conjunction with the appended drawings which form a part of this invention and in which like characters indicate like parts throughout the several views.

Referring to the drawings.

Figure 1:
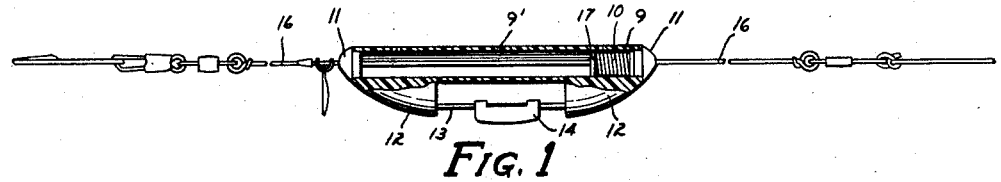
Fig. 1 is a side elevational view of the invention with some parts broken away and sectioned to show the spring compressed by tension in one direction only and in which the invention is interposed in a conventional tackle assembly.
Figure 2:
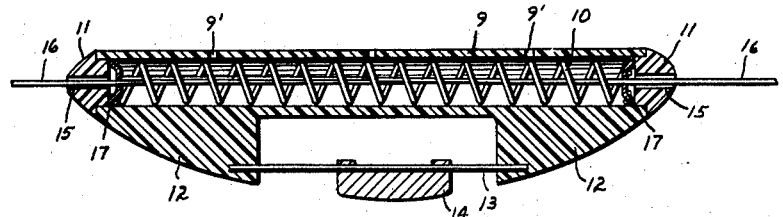
Fig. 2 is also a side elevation in full section showing the compensator spring without strain in either direction.
Figure 3:
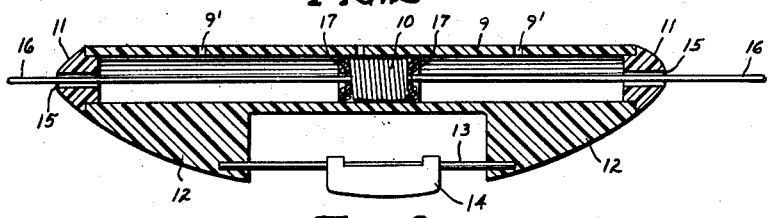
Fig. 3 is a view corresponding to Fig. 2 with the exception that the spring is shown compressed by strain from both directions.

The numeral 9 indicates an elongated tubular body portion that affords a coiled spring housing for the spring element 10 as shown best in Figs. 1, 2 and 3. This body portion 9 is provided with outwardly tapered end caps 11. A pair of relatively narrow lugs are longitudinally disposed along the lower outer edge portion of the tubular body portion 9 and are upwardly and outwardly tapered to meet the contour or radius of the end caps 11, thus materially reducing water resistance as the same is drawn through the water. These tapered ends also obviously offer little resistance to underwater obstructions and hence tend to eliminate the snagging of the device on rocks, weeds and the like.

A relatively narrow bar 13 connects the inner opposed longitudinally spaced faces of depending lugs 12 to afford a mount for interchangeable mountable weights or sinkers 14. A longitudinally disposed opening between the opposing inner faces of the lugs 12 is of relatively large size, thus permitting the use of weight members of various sizes and shape.

The tapered end caps 11 are provided with an axial bore 15 and a pair of drawbars 16 of relatively stiff wire extend into the body portion 9 from either end thereof and axially in a longitudinal plane between the convolutions of the spring element 10. The outer end portions of the drawbars 16 are terminated in conventional loops or eyes for connecting the same in a tackle assembly, as shown in Fig. 1. The inner end portions of the said drawbars are bent at a 90° angle to the longitudinal axis of the bar 16 and several convolutions of the wire are turned about the central axis of the bar 16, thus affording a base of resistance for one end portion of the spring element 10, as will be presently described.

A pair of washer members 17 are interposed between the convolution of the outer end portion of the drawbar 16 and the outer end portion of the spring element 10 for the purpose of preventing the threading of the said convolutions on the drawbar and the outer end portions of the spring element 10. These washers 17 are provided with a transversely elongated axially aligned slot to receive the respective drawbars 16 and hold the same in parallel alignment and to prevent the twisting of said members the one about the other, see Fig. 7.

It will thus be seen that with the parts heretofore described and as shown in Figs. 1, 2 and 3, the coiled spring element 10 is mounted in the body portion 9 which acts as a housing therefor, under slight strain so as to impinge the respective end caps 11 and hold the inner end portion of the drawbar 16 and the respective washer 17 in tight engagement with the inner surfaces of said end caps 11.

Obviously, when the compensator is interposed between the members of a conventional tackle assembly, as shown in Fig. 1, between the line and a leader, the line is attached to one of the drawbars 16, and the inner end portion of the leader is attached to the other drawbar to thus afford a line-compensator capable of relieving strain and imparting tautness regardless of the direction in which the element of force is applied in a single direction. In such a conventional assembly, it is possible for strain to be imposed on said assembly either by snagging the same on an underwater obstruction or by the strike of a fish. In either instance, the compensator will ease the strain of the initial strike or snag and at the same time tend to keep a taut line which is so highly important after a fish is hooked. However, regardless of how strain is imposed, each drawbar 16 working independently of one another against the strain of the spring being placed under strain, will equalize the strain on the component tackle elements. It can readily be seen that any strain imposed upon either end will automatically be compensated by the action of the other end of the spring being brought into opposing movement against the strain already being imposed by the initial compression of the spring element 10.

It has further been found that in the event of the line and tackle assembly becoming snagged on an underwater obstruction, the inherent weight of the compensator and weight assembly with the spring 10 fully compressed and suddenly freed, will project the assembly out of engagement with the obstruction on which it is snagged. Obviously, it is necessary that the body portion is capable of easily expelling its water content which finds access to the tubular body portion through the axial bores 15 in the end caps 11. For this purpose, we provide a plurality of ports 9' through which water may enter the cavity formed in the body 9 and similarly be expelled.

Figures 4, 5:
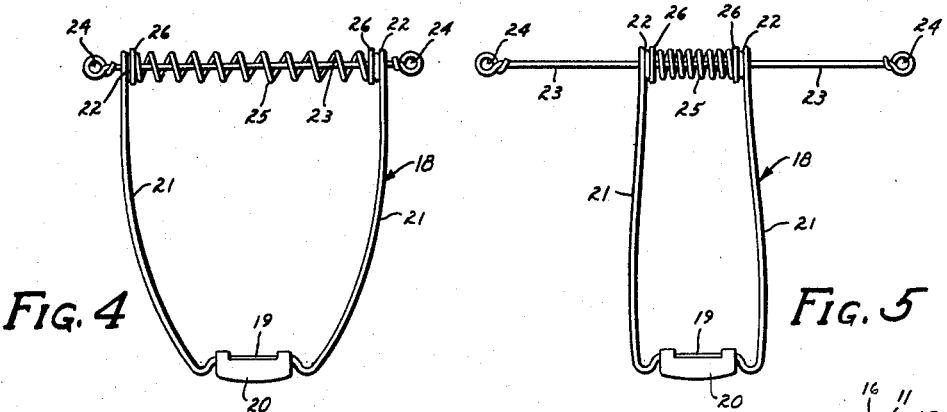
Fig. 4 is an elevational view showing a modified form of the invention.
Fig. 5 is a view corresponding to Fig. 4 with the exception that the spring element is shown compressed by strain from opposite directions simultaneously.

Referring now to the modification shown in Figs. 4 and 5: In this form of the invention, the components are identical in form and assembly except that there is no body portion 9 having end caps 11, these elements having been entirely omitted. Substituted therefor is a spring wire frame 18 that is in side elevation substantially U-shaped, the lower edge portion thereof being upturned and longitudinally flattened to afford a mount 19 for interchangeable weights 20. This spring wire frame 18 is formed of a single piece of wire having a pair of upturned sections 21. At their upper end portion, the sections 21 are bent at a 90° angle and have an eye 22 formed therein which acts as a guide for the parallel longitudinally projected end portions 23 which are terminated at the extreme outer end portions in eyes 24. These parallel longitudinally projected end portions project through the eyes 22 in opposing relation and afford a mount for a coiled spring 25 through which the sections extend axially. It may be noted here that the eyes 24 are of such diameter as to prevent them from passing through the eyes 22 which act as a stop to limit the inward movement of the sections 23 and thus keep the unit in assembled relation. It will be understood that the coiled spring must be assembled on its mount on the parallel sections 23 before the outer end portions of said sections are extended through the eyes 24.

Figures 6, 7, 8:
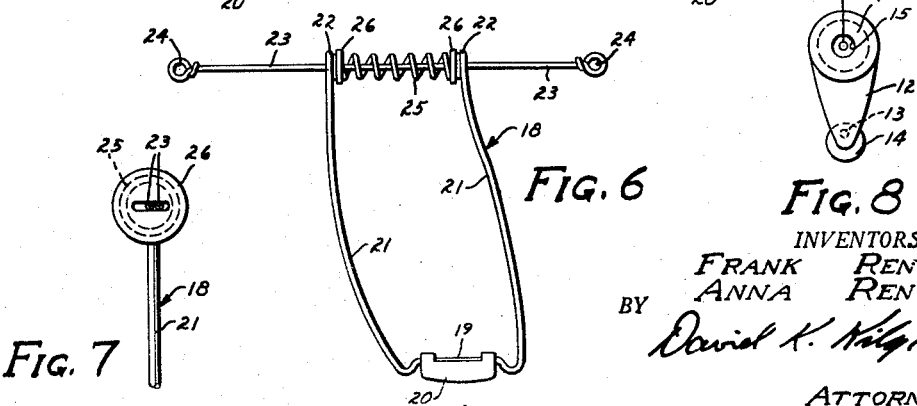
Fig. 6 is a view corresponding to Figs. 4 and 5 with the exception that the entire unit is shown as it would appear with strain imposed in one direction only.
Fig. 7 is a view in end elevation taken on the line 7—7 of Fig. 4.
Fig. 8 is a view in end elevation taken on the line 8—8 of Fig. 2.

A washer 26 having an axially disposed oblong slot, as shown in Fig. 7, is interposed between the upper end portions of the upturned sections of the wire U-frame 18 and the outer end portions of the spring 25. This washer holds the parallel longitudinally projected end portions 23 in parallel alignment and further affords a base of resistance for the spring 25 and prevents the end portions of said spring from becoming engaged with the eyes 22, thus effecting the free operation and movement of the spring.

In actual use, in a tackle assembly, the modification just described performs the compensator and exchangeable weight function in the same manner as the form of the invention disclosed in Figs. 1, 2 and 3. However, by virtue of its depending spring wire frame 18 and integral weight mount 19, this form of the invention particularly is well adapted for deep water fishing wherein it is desirable to troll or retrieve a line close to the bottom. In such cases, this depending frame acts as a skeg and virtually bounces along the bottom. The combined action of the spring frame 18 and the opposed action of the parallel section 23 against the compression of the spring 25 thus afford a compensator unit that is capable of overcoming any stresses imposed on the tackle assembly as a whole from contact with an underwater obstruction or a fish striking the attached lure.

While there are herein disclosed but a limited number of embodiments of the structure, process and product of the invention herein presented, it is possible to produce still other embodiments without departing from the inventive concept herein disclosed, and it is desired, therefore, that only such limitations be imposed on the appended claims as are stated herein, or required by the prior art.

What we claim is:

1. A fishing line compensator comprising in combination a spring wire frame having a lower edge portion, a pair of upturned members and a pair of parallel longitudinally disposed members, an eye formed in the upper end portion of each upturned member at right angles to the vertical plane of the spring wire frame, each of said eyes affording a guide for the outer end portion of its opposed longitudinal member and through which eye said member extends for endwise movements, an eye formed in the outer end portion of each longitudinal member for attaching the compensator to a tackle assembly, said last noted eyes further affording a stop means to limit the outward spring movement of the upturned members, and a coiled spring mounted on said longitudinally disposed members in axial arrangement, said spring cooperating in combination with the spring frame to compensate for strain imposed by simultaneous or independent outward pull of either or both of the longitudinal members, the lower edge portion of the said spring frame affording means for interchangeably mounting weight members.

2. The structure defined in claim 1 wherein the spring wire frame is substantially U-shaped.

3. The structure defined in claim 1 wherein the spring frame comprising the upturned members and the longitudinally disposed members is formed of a single piece of wire.

4. The structure defined in claim 1 wherein the lower end portions of the spring wire frame is substantially in a plane with the upper longitudinally disposed members to thus afford a mount for interchangeable weight members.

References Cited in the file of this patent

UNITED STATES PATENTS

| | | |
|---|---|---|
| 1,444,876 | Hansen | Feb. 13, 1923 |
| 2,631,401 | Kritzer | Mar. 17, 1953 |
| 2,754,611 | Riner | July 17, 1956 |